(12) United States Patent
Peterson

(10) Patent No.: US 12,291,150 B2
(45) Date of Patent: May 6, 2025

(54) VEHICULAR DRIVER MONITORING SYSTEM WITH CAMERA DISPOSED BEHIND PRISMATIC MIRROR ELEMENT OF INTERIOR REARVIEW MIRROR ASSEMBLY

(71) Applicant: Magna Mirrors of America, Inc., Holland, MI (US)

(72) Inventor: Austen C. Peterson, Hudsonville, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 111 days.

(21) Appl. No.: 18/459,515

(22) Filed: Sep. 1, 2023

(65) Prior Publication Data

US 2024/0075878 A1 Mar. 7, 2024

Related U.S. Application Data

(60) Provisional application No. 63/377,536, filed on Sep. 29, 2022, provisional application No. 63/374,425, filed on Sep. 2, 2022, provisional application No. 63/374,263, filed on Sep. 1, 2022.

(51) Int. Cl.
*B60R 1/12* (2006.01)
*B60R 1/04* (2006.01)
*G06V 20/59* (2022.01)

(52) U.S. Cl.
CPC .............. *B60R 1/12* (2013.01); *G06V 20/597* (2022.01); *B60R 1/04* (2013.01); *B60R 2001/1253* (2013.01)

(58) Field of Classification Search
CPC ..... B60R 1/04; B60R 1/12; B60R 2001/1253; G06V 20/597
USPC ........................................................ 348/148
See application file for complete search history.

(56) References Cited

U.S. PATENT DOCUMENTS

| | | | |
|---|---|---|---|
| 7,914,187 B2 | 3/2011 | Higgins-Luthman et al. |
| 8,503,061 B2 | 8/2013 | Uken et al. |
| 9,405,120 B2 | 8/2016 | Graf et al. |
| 10,017,114 B2 | 7/2018 | Bongwald |
| 10,046,706 B2 | 8/2018 | Larson et al. |

(Continued)

FOREIGN PATENT DOCUMENTS

WO 2023220222 A1 11/2023

*Primary Examiner* — Christopher S Kelley
*Assistant Examiner* — Asmamaw G Tarko
(74) *Attorney, Agent, or Firm* — HONIGMAN LLP

(57) ABSTRACT

A vehicular cabin monitoring system includes an interior rearview mirror assembly having a mirror head that accommodates a prismatic mirror reflective element. A camera is accommodated by the mirror head. The mirror reflective element is adhesively attached at a mirror back plate of the mirror head. An optically clear adhesive (OCA) and a neutral density (ND) filter are disposed between the mirror back plate and a mirror reflector coating disposed at a rear side of the mirror reflective element. The camera views through (i) the OCA, (ii) the ND filter, (iii) the mirror reflector coating of the mirror reflective element, and (iv) the glass substrate of the mirror reflective element. With the interior rearview mirror assembly attached at an interior portion of a vehicle, image data captured by the camera is processed at an electronic control unit (ECU) for a cabin monitoring function.

38 Claims, 16 Drawing Sheets

(56) References Cited

U.S. PATENT DOCUMENTS

| | | |
|---|---|---|
| 10,065,574 B2 | 9/2018 | Tiryaki |
| 10,442,360 B2 | 10/2019 | LaCross et al. |
| 10,958,830 B2 | 3/2021 | Koravadi |
| 11,242,008 B2 | 2/2022 | Blank et al. |
| 11,518,401 B2 | 12/2022 | Kulkarni |
| 11,639,134 B1 | 5/2023 | Huizen et al. |
| 11,780,372 B2 | 10/2023 | Sobecki et al. |
| 11,827,153 B2 | 11/2023 | Miller et al. |
| 2014/0285666 A1 | 9/2014 | O'Connell et al. |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2017/0217367 A1 | 8/2017 | Pflug et al. |
| 2017/0274906 A1 | 9/2017 | Hassan et al. |
| 2018/0134217 A1 | 5/2018 | Peterson et al. |
| 2018/0222414 A1 | 8/2018 | Ihlenburg et al. |
| 2018/0231976 A1 | 8/2018 | Singh |
| 2019/0118717 A1 | 4/2019 | Blank et al. |
| 2019/0168669 A1* | 6/2019 | Lintz ................ B60R 1/26 |
| 2019/0381938 A1* | 12/2019 | Hopkins ............ G06F 3/013 |
| 2020/0143560 A1 | 5/2020 | Lu et al. |
| 2020/0202151 A1 | 6/2020 | Wacquant |
| 2020/0320320 A1 | 10/2020 | Lynam |
| 2021/0056306 A1* | 2/2021 | Hu ................ G06V 40/193 |
| 2021/0155167 A1 | 5/2021 | Lynam et al. |
| 2021/0162926 A1 | 6/2021 | Lu |
| 2021/0245662 A1* | 8/2021 | Blank ............... B60R 1/081 |
| 2021/0291739 A1* | 9/2021 | Kasarla ............. B60R 1/04 |
| 2021/0323473 A1* | 10/2021 | Peterson ........... B60R 1/025 |
| 2022/0111857 A1 | 4/2022 | Kulkarni |
| 2022/0242438 A1* | 8/2022 | Sobecki ............ G06V 20/597 |
| 2022/0254132 A1 | 8/2022 | Rother |
| 2022/0377219 A1 | 11/2022 | Conger et al. |
| 2023/0137004 A1* | 5/2023 | Huizen ............. H04N 25/10 |
| | | 348/77 |
| 2024/0064274 A1 | 2/2024 | Blank et al. |

* cited by examiner

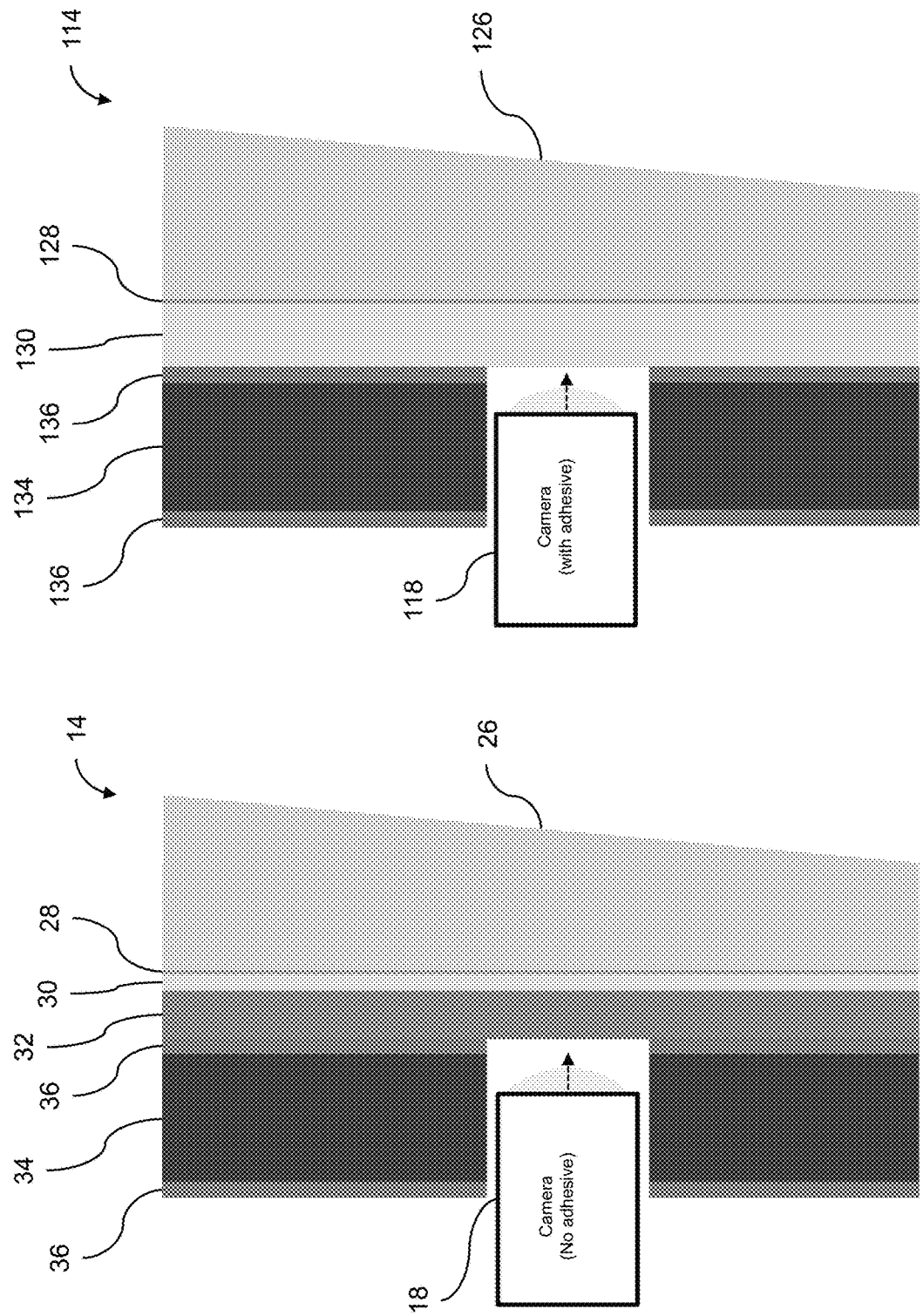

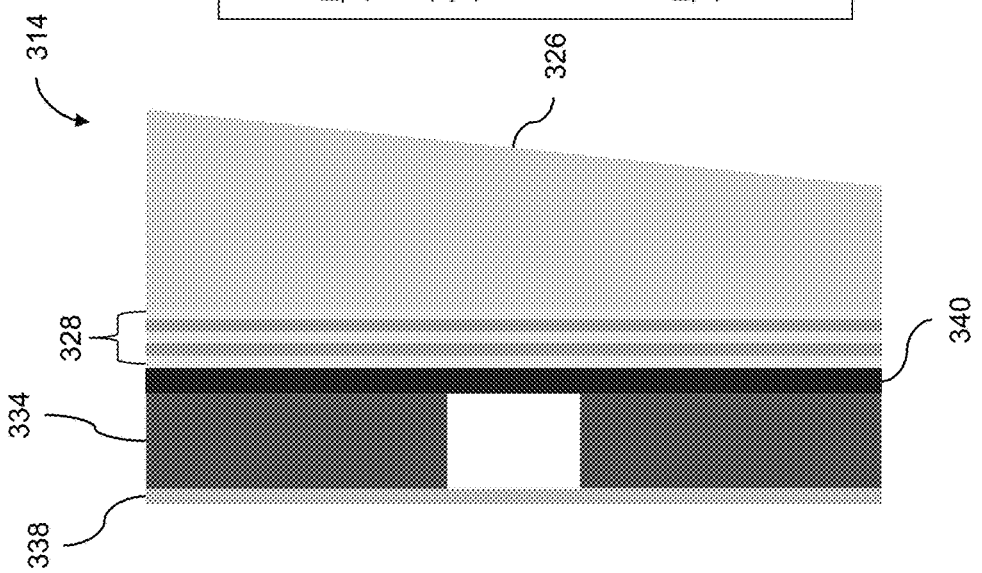

Material Specifications

<u>Prism Glass</u>
- 3° angle
- 2 shapes according to drawings
  - Size: ~240 mm × 60 mm
  - Thickness: 2.2 mm → 5.5 mm & 2.9 mm → 5.7 mm
- Soda lime glass
  - Per Magna glass specification (composition / optics)

<u>Coating Stack</u>
- P12, P45 or P46 stack
- 5 layers
  - $Nb_2O_5$ : 100 – 150 nm
  - $SiO_2$ : 50 – 90 nm
  - $Nb_2O_5$ : 50 – 80 nm
  - $SiO_2$ : 60 – 95 nm
  - $Nb_2O_5$ : 55 – 75 nm
  - Total stack thickness: ~315 – 490 nm <u>IR Transmissive Paint</u>
- Teikoku IRX-HF Ink
  - Or equivalent IR transmissive and visible light blocking ink / paint to meet performance specifications for reflectivity, transmission and reflective color <u>Foam Tape</u>
- Tesa 62708
  - 0.8 mm thick
  - With cutouts per drawing
  - Matched to profile of the glass (full coverage)
- Tesa 62852 (0.5 mm thick)

Performance Specifications

<u>Reflectivity</u>
- Visible 47 ± 3%

<u>Transmission</u>
- Measured at ~4.3 mm thick
  - Photopic : 2 ± 2%
  - Visible (avg. 425 – 630) : 2 ± 2%
  - Infrared (avg. 900 – 1000) : 65% minimum <u>Reflective Color</u>
- LAB as measured from 1st surface
  - L : 63 ± 4
  - A* : 1.5 ± 1
  - B* : 1.6 ± 5

FIG. 6

| | Polished (Glossy) Surface | Sand blasted (Textured) Surface |
|---|---|---|
| Overall Evaluations | | |
| Contrast — Tape and Attachment Plate | 🙂 | 🙂 |
| Highlighting of Geometry — Rounds and Chamfers | 🙁 | 🙁 |
| Camera Opening Geometry Evaluations | | |
| Control — Small chamfer with rounds | 🙁 | 🙁 |
| Recessed Continous Surface | 🙂 | 🙂 |
| Linear Continous Surface | 🙁 | 🙂 |
| Accelerating Continous Surface | 🙁 | 🙁 |
| Large Round | 🙁 | 🙁 |

FIG. 12

VEHICULAR DRIVER MONITORING SYSTEM WITH CAMERA DISPOSED BEHIND PRISMATIC MIRROR ELEMENT OF INTERIOR REARVIEW MIRROR ASSEMBLY

CROSS REFERENCE TO RELATED APPLICATIONS

The present application claims the filing benefits of U.S. provisional application Ser. No. 63/377,536, filed Sep. 29, 2022, U.S. provisional application Ser. No. 63/374,425, filed Sep. 2, 2022, and U.S. provisional application Ser. No. 63/374,263, filed Sep. 1, 2022, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element.

SUMMARY OF THE INVENTION

A cabin monitoring system or driving assistance system or vision system or imaging system for a vehicle utilizes one or more cameras (preferably one or more CMOS cameras) to capture image data. The system may include a mirror head adjustably attached at a mounting structure or base. The mounting structure is configured to attach at an interior portion of a vehicle. The mirror head includes a prismatic mirror reflective element. A camera is accommodated by the mirror head. The prismatic mirror reflective element comprises a wedge-shaped glass substrate and a mirror reflective coating disposed at a rear side of the wedge-shaped glass substrate. An optically clear adhesive (OCA) is applied at the mirror reflector coating of the prismatic mirror reflective element. A foam tape may be adhered at the OCA. A mirror back plate may be adhesively attached at the foam tape. The camera views through (i) the OCA, (ii) the mirror reflector coating of the prismatic mirror reflective element, and (iii) the glass substrate of the prismatic mirror reflective element. Optionally, a neutral density (ND) filter is disposed between the mirror reflector coating and the foam tape and the camera views through the ND filter. A light emitter may be accommodated by the mirror head and operable, when electrically powered to emit light, to emit near infrared (NIR) light. An electronic control unit (ECU) comprises electronic circuitry and associated software, and the electronic circuitry of the ECU comprises an image processor for processing image data captured by the camera. With the mounting structure attached at the interior portion of the vehicle, image data captured by the camera is processed at the ECU for a cabin monitoring function, such as an occupant monitoring function or a driver monitoring function.

These and other objects, advantages, purposes and features of the present invention will become apparent upon review of the following specification in conjunction with the drawings.

BRIEF DESCRIPTION OF THE DRAWINGS

FIG. 3 is a sectional view of a mirror reflective element assembly with a DMS camera disposed at and viewing through the mirror reflector coating and glass substrate of the mirror reflective element assembly;

FIG. 4 is a sectional view of another mirror reflective element assembly with a DMS camera disposed at and viewing through the mirror reflector coating and glass substrate of the mirror reflective element assembly;

FIG. 6 is a sectional view of another mirror reflective element assembly, showing example performance specifications and material specifications for the mirror reflective element assembly;

FIG. 12 is a chart comparing contrast evaluations for the example chamfer configurations of FIGS. 11A and 11B;

DESCRIPTION OF THE PREFERRED EMBODIMENTS

Figure 1:
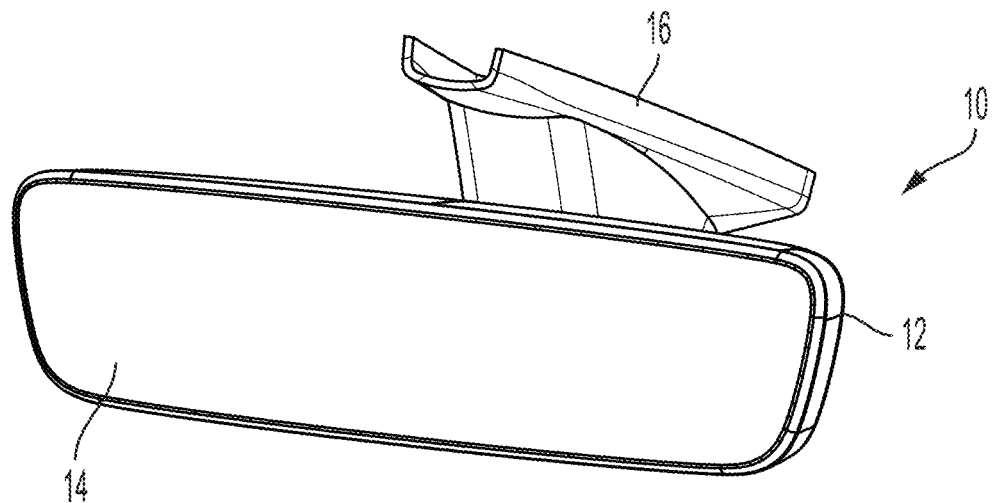
FIG. 1 is a perspective view of an interior rearview mirror assembly having a driver monitoring camera and a near infrared light emitter behind a reflective element of the interior rearview mirror assembly.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror reflective element 14 may comprise a prismatic mirror reflective element that comprises a wedge-shaped glass substrate that can be flipped between a daytime orientation and a nighttime or anti-glare orientation. The system includes a camera 18 disposed behind the mirror reflective element 14 and viewing through the mirror reflective element for capturing image data representative of the interior cabin of the vehicle, including the driver's head region and occupant region of the vehicle cabin. The system may utilize aspects of driver monitoring systems or occupant monitoring systems described in U.S. Publication No. US-2022-0377219 and/or International Publication Nos. WO 2023/034956; WO 2022/241423 and/or WO 2022/187805 which are all hereby incorporated herein by reference in their entireties.

Figure 2:
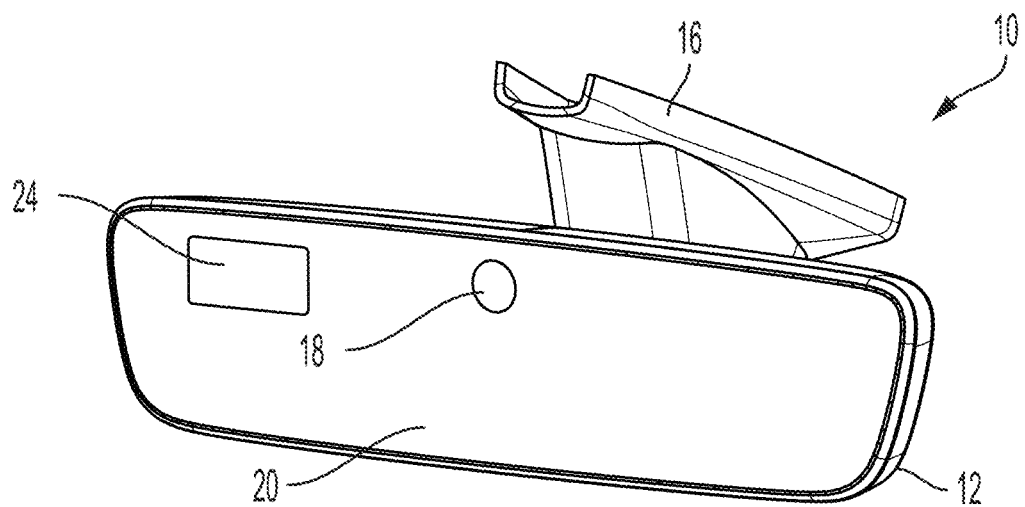
FIG. 2 is another perspective view of the interior rearview mirror assembly, showing the driver monitoring camera and light emitters without the reflective element.

The mirror assembly 10 includes or is associated with a driver monitoring system (DMS), with the mirror assembly comprising the driver/occupant monitoring camera 18 disposed at a back plate 20 (and viewing through an aperture of the back plate) behind the reflective element 14 and viewing through the reflective element toward at least a head region of the driver of the vehicle (FIG. 2). The DMS includes one or more infrared (IR) or near infrared (NIR) light emitter(s) 24, which may be disposed at the back plate 20 and may emit light through another aperture of the back plate and through the reflective element.

As shown in FIG. 3, the camera is disposed behind the wedge-shaped glass substrate 26 of the prismatic mirror reflective element 14 so as to view through the mirror reflector coating 28 at the glass substrate. In order to limit wet out issues, imperfections in foam tape adhesive and to limit camera visibility to people within the vehicle cabin (by introducing a lower index material on top of the high index multi-layer reflective coating) an automotive grade optically clear adhesive (OCA) 30 is applied to the reflective coating 28. The OCA layer 30 can be coupled with a neutral density (ND) filter 32 to obtain the proper optical path for the machine vision system and visibility of the camera 18. The OCA 30 can also be tinted to obtain the proper optical path. The ND filter comprises a filter or element that filters or attenuates or modifies the intensity of most or all wavelengths or colors of light passing through the filter substantially equally. For example, the ND filter filters or attenuates or modifies the intensity of visible light that passes through the ND filter in a substantially equal manner as IR light or NIR light that passes through the ND filter.

The camera 18 is disposed within or partially within a foam tape or element 34 that is adhesively attached at the ND filter 32, such that the camera 18 views through the ND filter 32 and the OCA 30 and the mirror reflector coating 28 and the glass substrate 26. Another layer of adhesive 36 is disposed at the back or rear side of the foam 34 for adhering the plastic mirror back plate 20 (which may hold or support or accommodate the camera and light emitters) at the rear of the mirror reflective element 14. The camera 18 is disposed at and/or views through an aperture formed in the foam 34.

In other words, with the DMS camera 18 disposed at the back plate 20 of the mirror assembly, a foam tape or element 34 is disposed at the back plate 20 and configured to attach the glass substrate 26 at the back plate 20. For example, a first layer of adhesive 36 is disposed at a first side of the foam tape 34 for attaching the foam tape 34 at the back plate 20. A second layer of adhesive 36 is disposed at the opposite second side of the foam tape 34, with the ND filter 32 (e.g., a polymethyl methacrylate (PMMA) or polycarbonate (PC) film or ND filter) disposed at the second layer of adhesive 36. The OCA or tinted OCA 30 is applied at the reflective coating 28, with the OCA 30 disposed at the ND filter 32 and the reflective coating 28 behind the glass substrate 26. Thus, with the camera 18 disposed at the aperture formed through the foam tape 34 and layers of adhesive 36, the camera 18 views through the glass substrate 26, the reflective coating 28, the OCA 30, and the ND filter 32.

Because the OCA 30 has a different refractive index than the reflective coating 28 (e.g., the refractive index of the OCA 30 is lower than the refractive index of the reflective coating), the camera 18 viewing through the OCA 30 and the reflective coating 28 (and optionally the ND filter 32) has an improved optical path. Application of the OCA 30 limits wet out issues, imperfections in the foam tape and reduces visibility of the camera 18 behind the reflective element 14.

Optionally, and such as shown in FIG. 4, the foam 134 is adhesively attached at the OCA 130 (without an ND filter disposed between the foam and the OCA), with the camera 118 disposed at and/or viewing through an aperture formed in the foam 134 and viewing through the OCA 130 and the mirror reflector coating 128 and the glass substrate 126 of the mirror reflective element 114. That is, the mirror reflective element 114 includes the OCA layer 130 applied between the reflective coating 128 and the adhesive 136 at the foam tape 134 so that the camera 118 views through the glass substrate 126, the reflective coating 128, and the OCA 130.

Figure 5:
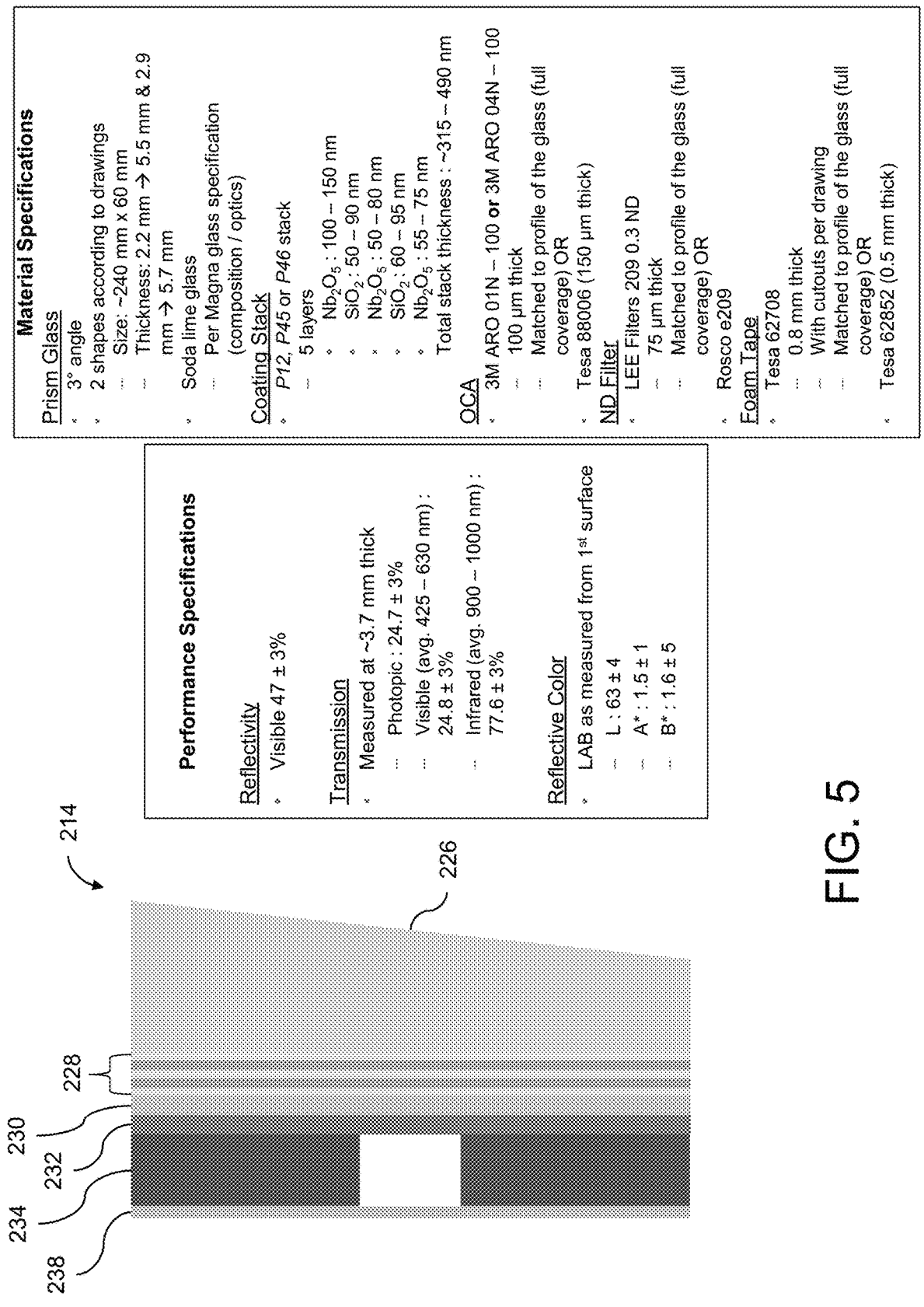
FIG. 5 is a sectional view of another mirror reflective element assembly, showing example performance specifications and material specifications for the mirror reflective element assembly.

As shown in FIG. 5, the mirror reflector coating 228 may comprise a stack of alternating high and low refractive layers, such as alternating $Nb_2O_5$ and $SiO_2$ layers. The alternating layers of the mirror reflector coating 228 may have different thicknesses, where the thickness of subsequent layers in the stack may be reduced. For example, the first layer (e.g., $Nb_2O_5$) of a five-layer mirror reflector coating stack may have a thickness between 100 nm and 150 nm, the second layer (e.g., $SiO_2$) may have a thickness between 50 nm and 90 nm, the third layer (e.g., $Nb_2O_5$) may have a thickness between 50 nm and 80 nm, the fourth layer (e.g., $SiO_2$) may have a thickness between 60 nm and 95 nm, and the fifth layer (e.g., $Nb_2O_5$) may have a thickness between 55 nm and 75 nm. The total thickness of the five-layer stack may be between about 315 nm and 490 nm. Further characteristics of the mirror reflector coating stack 228 are described below.

The OCA 230 is disposed between the mirror reflector coating stack 228 and the ND filter 232, and the foam tape 234 is disposed at the ND filter 232, with a protective liner 238 disposed at the rear side of the foam tape 234 (the protective liner may be removed to expose the adhesive at the foam tape for adhesively attaching the mirror reflective element at the back plate, with the camera then disposed at the aperture through the foam tape). Thus, the mirror reflective element 214 includes the mirror reflector coating stack 228 disposed at a rear surface of the glass substrate 226. The OCA layer 230 is disposed between the mirror reflector coating stack 228 and the ND filter 232 and the adhesive tape 234 is disposed at the ND filter 232 to adhesively attach the mirror reflective element 214 at the back plate of the mirror assembly. The protective liner 238 may be disposed at the adhesive tape 234 for removal from the adhesive tape 234 before attaching the mirror reflective element 214 at the back plate of the mirror assembly. The mirror reflective element 214 provides some or all of the performance specifications set forth below.

Performance Specifications:
  Reflectivity:
    Visible 45 percent minimum, such as 47±3 percent
  Transmission:
    Measured at about 3.7 mm thick
      Photopic: 24.7±3 percent
      Visible (avg. 425 nm to 630 nm): 24.8±3 percent
      Infrared (avg. 900 nm to 1000 nm): 77.3±3 percent
  Reflective Color:
    LAB as measured from $1^{st}$ surface
      L: 63±4
      A*: 4.5±1
      B*: 1.6±5

The mirror reflective element assembly 214 may have some or all of the material specifications set forth below.

Material Specifications:
  Prism Glass:
    3 degree angle
    2 shapes according to drawings
      Size: about 240 mm by 60 mm
      Thickness: 2.2 mm to 5.5 mm and 2.9 mm to 5.7 mm
  Soda lime glass:
    Per glass specification (composition/optics)
  Coating Stack:
  5 layers:
    $Nb_2O_5$: 100 nm to 150 nm
    $SiO_2$: 50 nm to 90 nm
    $Nb_2O_5$: 50 nm to 80 nm
    $SiO_2$: 60 nm to 95 nm
    $Nb_2O_5$: 55 nm to 75 nm
  Total stack thickness: about 315 nm to 490 nm
  OCA:
  3M ARO 01N-100 or 3M ARO 04N-100
    100 µm thick
    Matched to profile of the glass (full coverage)
  Tesa 88006
    150 µm thick
  ND Filter:
  LEE Filters 209 0.3 ND
    75 µm thick
    Matched to profile of the glass (full coverage)
  Rosco e209
  Foam Tape:
  Tesa 62708
    0.8 mm thick
    With cutouts per drawing
    Matched to profile of the glass (full coverage)
  Tesa 62852
    0.5 mm thick Optionally, a mirror reflective element assembly 314 may include an infrared (IR) light transmissive paint or coating 340 (that transmits IR light and attenuates or blocks visible light) disposed at the mirror reflector coating stack 328. For example, and such as shown in FIG. 6, the IR transmissive paint or coating 340 may be disposed between the foam tape 334 and the mirror reflector coating stack 328 at the rear side of the prism glass substrate 326. The camera (not shown in FIG. 6) is partially disposed at and/or views through an aperture in the foam tape 334 and views through the IR transmissive paint or coating 340 and the mirror reflector coating stack 328 and the prism glass substrate 326.

In other words, the mirror reflective element assembly 314 includes the IR light transmissive paint or coating 340 that at least partially transmits IR light and that at least partially attenuates visible light incident at the mirror reflective element assembly 314. A protective liner 338 may be disposed at the foam tape 334 for removal from the mirror reflective element 314 prior to attachment at the back plate of the mirror head. Thus, with the camera disposed within the aperture of the foam tape 334 and behind the glass substrate 326, the mirror reflector coating stack 328, and the IR light transmissive coating 340, visibility of the camera and imperfections in the foam tape 334 is reduced. The camera may capture image data representative of IR light or near IR light that passes through the mirror reflective element 314.

As shown in FIG. 6, the mirror reflector coating 328 may comprise a stack of alternating high and low refractive layers, such as alternating $Nb_2O_5$ and $SiO_2$ layers. The mirror reflective element 314 provides some or all of the performance specifications set forth below.

Performance Specifications:
  Reflectivity:
    Visible 45 percent minimum, such as 47±3 percent
  Transmission:
    Measured at about 4.3 mm thick
      Photopic: 2±2 percent
      Visible (avg. 425 nm to 630 nm): 2±2 percent
      Infrared (avg. 900 nm to 1000 nm): 65 percent minimum
  Reflective Color:
    LAB as measured from $1^{st}$ surface
      L: 63±4
      A*: 1.5±1
      B*: 1.6±5

The mirror reflective element assembly 314 may have some or all of the material specifications set forth below.

Figure 7:
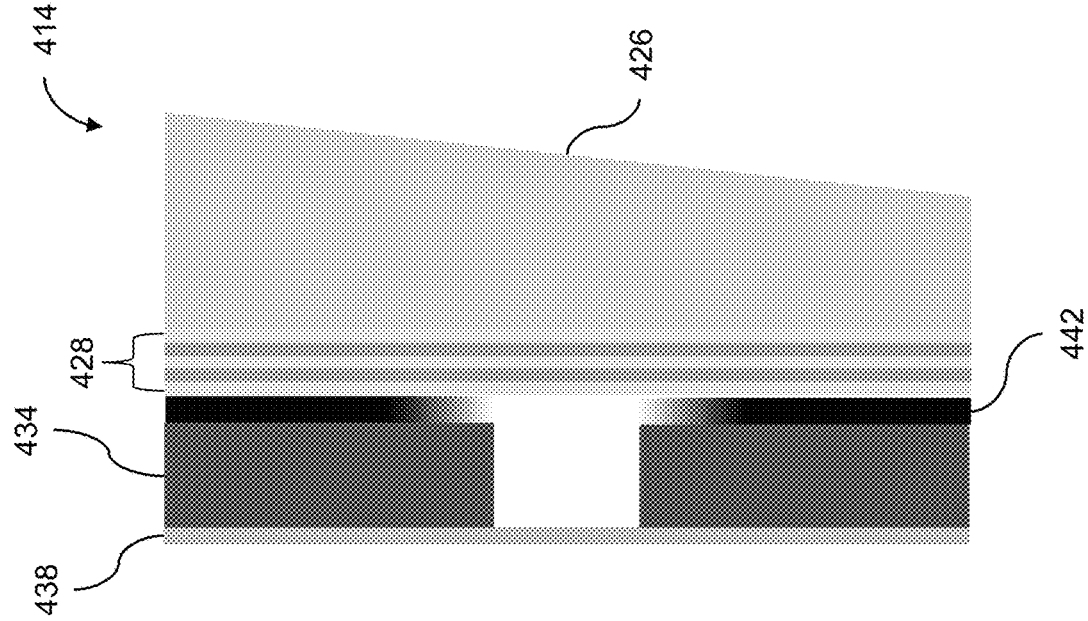
FIG. 7 is a sectional view of another mirror reflective element assembly.

Material Specifications:
  Prism Glass:
    3 degree angle
    2 shapes according to drawings
      Size: about 240 mm by 60 mm
      Thickness: 2.2 mm to 5.5 mm and 2.9 mm to 5.7 mm
  Soda lime glass:
    Per glass specification (composition/optics)
  Coating Stack:
  5 layers:
    $Nb_2O_5$: 100 nm to 150 nm
    $SiO_2$: 50 nm to 90 nm
    $Nb_2O_5$: 50 nm to 80 nm
    $SiO_2$: 60 nm to 95 nm
    $Nb_2O_5$: 55 nm to 75 nm
  Total stack thickness: about 315 nm to 490 nm IR Transmissive Paint:
Teikoku IRX-HF Ink
   Or equivalent IR transmissive and visible light blocking ink/paint to meet performance specifications for reflectivity, transmission and reflective color
Foam Tape:
Tesa 62708
   0.8 mm thick
   With cutouts per drawing
   Matched to profile of the glass (full coverage)
Tesa 62852
   0.5 mm thick Optionally, and such as shown in FIG. 7, a mirror reflective element assembly 414 may include a chrome or silver coating 442 disposed at the mirror reflector coating stack 428. The chrome or silver coating or layer 442 has a low light transmission (low % T) for all wavelengths (including visible and near-infrared light). The camera (not shown in FIG. 7 is partially disposed at and/or views through an aperture in the foam tape 434 and an aperture in the chrome or silver coating or layer 442 and views through the mirror reflector coating stack 428 and the prism glass substrate 426. Further, the IR light emitter may be disposed at and/or emit light that passes through a corresponding aperture in the chrome or silver coating or layer 442. The apertures formed through the chrome or silver coating or layer 442 may be tapered or feathered to provide gradation transitions around the camera and/or IR light emitter and the window. The chrome or silver coating 442 and feathered or tapered transition at the window may utilize aspects of the mirror reflective elements and coatings described in U.S. Pat. No. 8,503,061, which is hereby incorporated herein by reference in its entirety.

In other words, the mirror reflective element assembly 414 includes the chrome or silver coating 442 disposed between the mirror reflector coating stack 428 and the foam tape 434. The camera is disposed at the aperture in the foam tape 434 (with a protective liner 438 disposed at the foam tape 434) and views through the mirror reflector coating stack 428 and the glass substrate 426. The chrome or silver coating 442 may include an aperture that aligns with the one or more apertures in the foam tape 434 and the camera and/or IR light emitter. The chrome or silver coating 442 may include a gradient or feathered region so that the chrome or silver coating 442 has a higher light transmissivity at portions at or near the camera and/or IR light emitter and a lower light transmissivity at portions further from the camera and/or IR light emitter. Optionally, the camera and/or IR light emitter are disposed behind and view/emit light through respective portions of the chrome or silver coating 442 having a relatively higher light transmissivity. Thus, the chrome or silver coating 442 reduces visible light transmission through the mirror reflective element assembly 414, such as to hide imperfections in the foam tape 434.

Figure 8B:
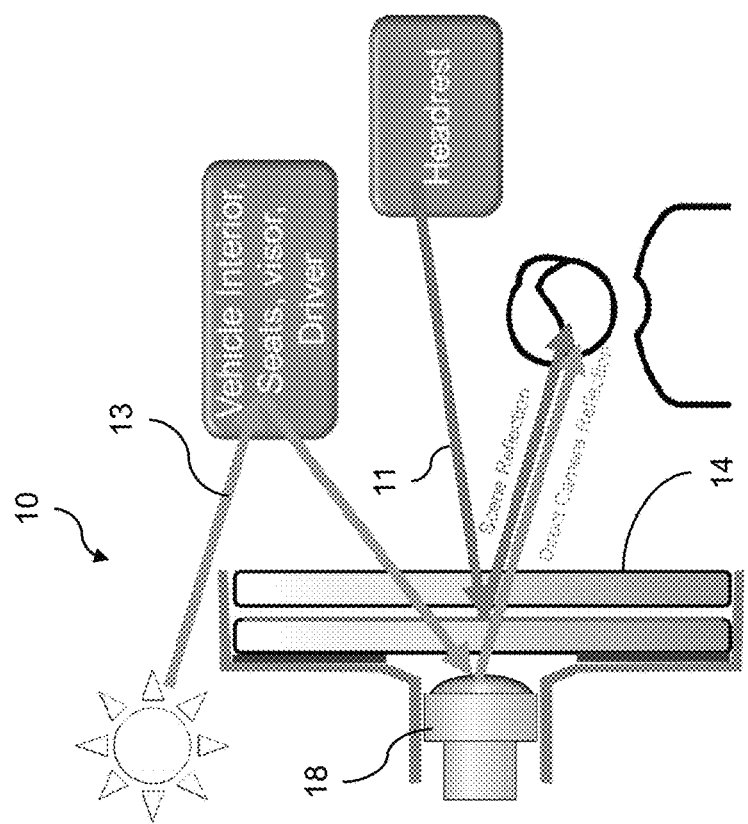
FIG. 8B is schematic view of light reflected from the mirror reflective element and the camera of the interior rearview mirror assembly during conditions that provide normal illumination at the mirror reflective element and low illumination of objects within the rearward field of view provided by the mirror reflective element.
Figure 8A:
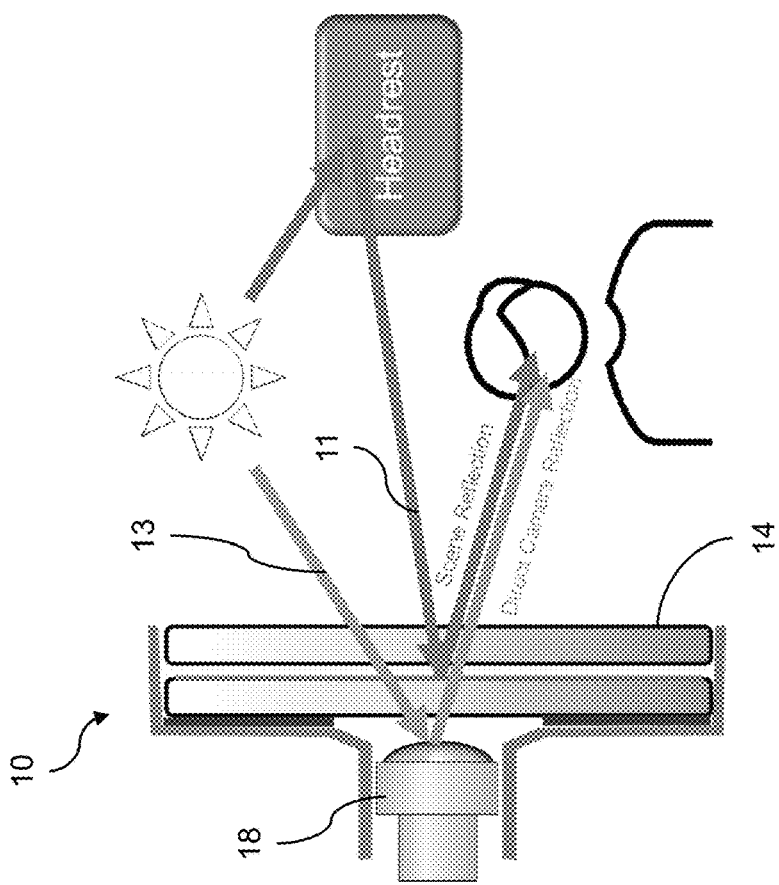
FIG. 8A is a schematic view of light reflected from the mirror reflective element and the camera of the interior rearview mirror assembly during conditions that provide excessive illumination at the mirror reflective element.
Figure 10:
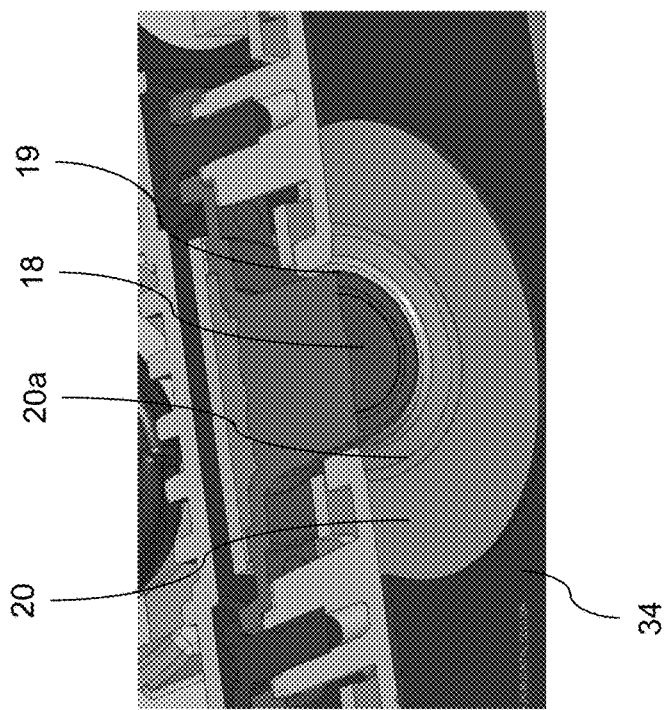
FIGS. 9 and 10 are views of the camera and mirror reflective element of the interior rearview mirror assembly, with mitigated contrast between components reducing camera visibility.
Figure 9:
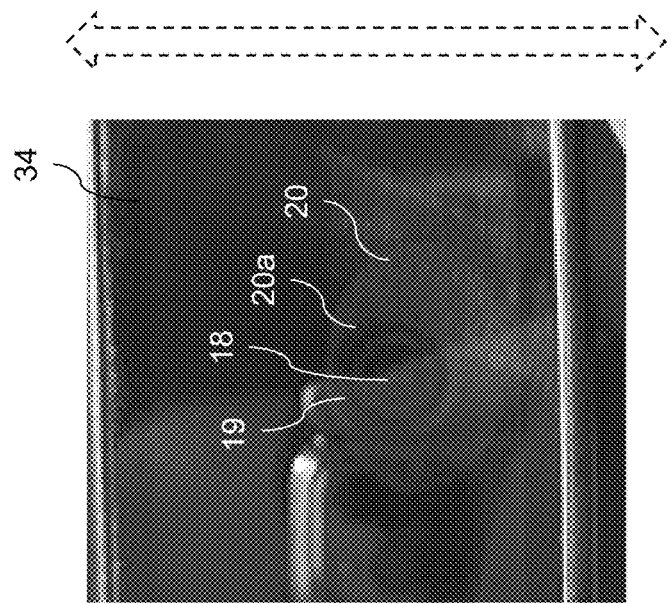

FIGS. 8A and 8B show and discuss how camera visibility is affected by lighting conditions. With the mirror assembly 10 disposed at the interior portion of the vehicle and the mirror reflective element 14 providing a rearward field of view to the driver of the vehicle, the camera 18 is disposed at the mirror head behind the mirror reflective element 14 and views the vehicle cabin (including a head region of the driver) through the mirror reflective element 14. A scene reflection 11 (i.e., visible light that is reflected from objects within the vehicle, such as the headrest, and objects rearward of the mirror assembly) is visible to the driver of the vehicle via reflections at the mirror reflective element 14 to allow the driver to view the rearward field of view provided by the mirror assembly. A direct reflection 13 (i.e., visible light that is reflected from the camera 18 and that passes through the mirror reflective element to be viewed by the driver of the vehicle) allows the driver to view the camera 18 that is behind the mirror reflective element 14. The direct reflection 13 may include visible light that directly reflects from the camera 18 (FIG. 8A) and visible light that reflects from objects within the vehicle and objects rearward of the mirror assembly (e.g., the vehicle interior, the vehicle seats, the visor, the driver and the like) and then reflects from the camera 18 (FIG. 8B). When magnitude of light of the scene reflection 11 is greater than magnitude of light of the direct reflection 13, the camera 18 may not be readily visible to the driver and the driver may instead view the rearward field of view provided by the mirror assembly. When magnitude of light of the direct reflection 13 is greater than magnitude of light of the scene reflection 11, the camera 18 may be readily visible to the driver.

In other words, the camera 18 may be visible during excessive illumination of the mirror surface (FIG. 8A), such as when the sun or other light source (e.g., headlights from another vehicle or overhead console lights) is at a low oblique angle relative to the mirror surface (e.g., during sunrise, sunset or due to headlights from rearward traffic), as this results in the magnitude of the direct reflection 13 to be greater than the magnitude of the scene reflection 11. The camera 18 may be more visible during these conditions because the difference in magnitude between the direct reflection 13 and the scene reflection 11 is larger. Excessive illumination of the mirror reflective element may result in higher levels of visibility of the camera (and other internal components of the mirror head such as the glare sensor, compass and the like). Although excessive illumination may be a less frequent condition, it may be difficult to resolve due to the magnitude of direct sunlight and RGB requirement.

The camera 18 may also be visible when the magnitude of light of the scene reflection 11 is reduced (FIG. 8B), such as when darker objects are viewed in the reflection at the mirror reflective element 14 during normal illumination of the mirror surface. For example, when reflections at the mirror reflective element 14 include a dark and shadowed headrest or headliner of the vehicle, a dark trailer behind the vehicle and/or a dark background, such as when the vehicle is exiting a garage or tunnel or bridge, the camera 18 may be visible because the magnitude of light of the direction reflection 13 is greater than the relatively low magnitude of light of the scene reflection 11. The camera 18 may be less visible during these conditions as the difference in magnitude between the direct reflection 13 and the scene reflection 11 is lower. Regular or normal illumination of the mirror reflective element (and reduced illumination of the scene within the field of view provided by the mirror reflective element) may result in lower levels of visibility of the camera and may be a more common condition.

Figures 16A, 16B, 16C:
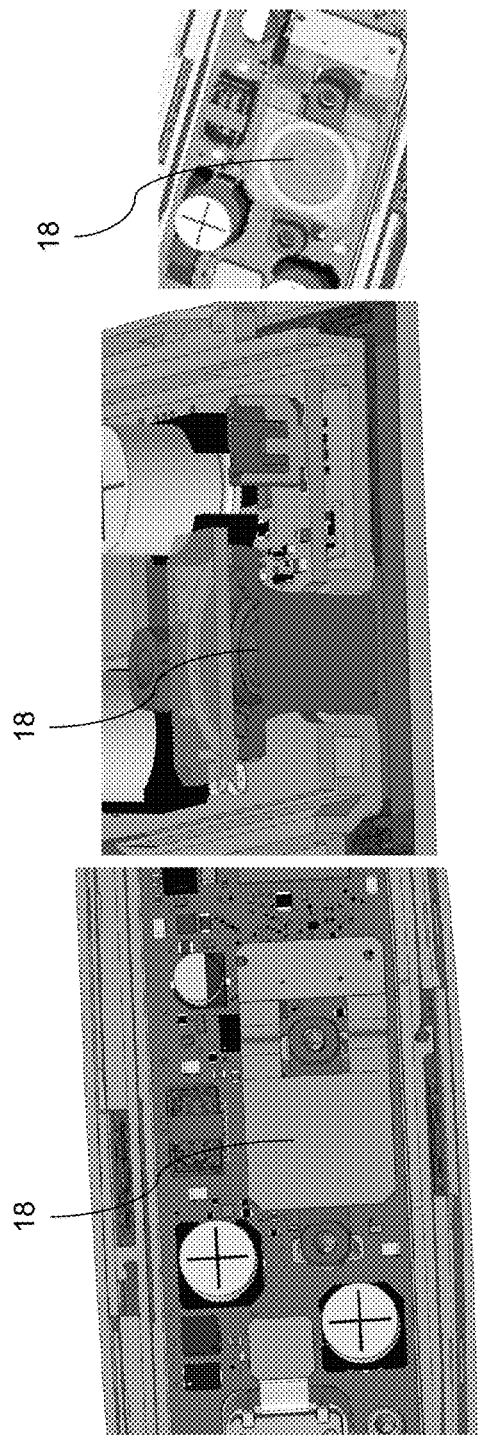
FIGS. 16A-16C are views of the camera and additional electronic components within the mirror head of the interior rearview mirror assembly.
Figure 17:
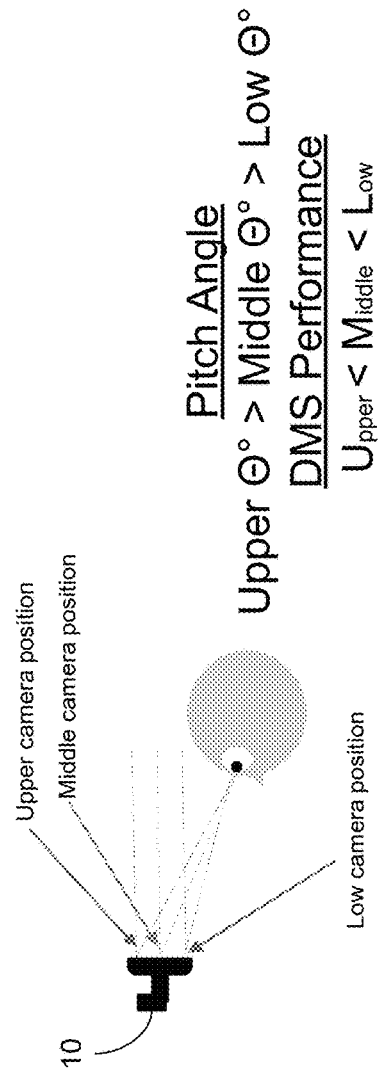
FIG. 17 is a schematic view depicting the pitch angle of the camera when positioned at different regions of the mirror head of the interior rearview mirror assembly.
Figure 18:
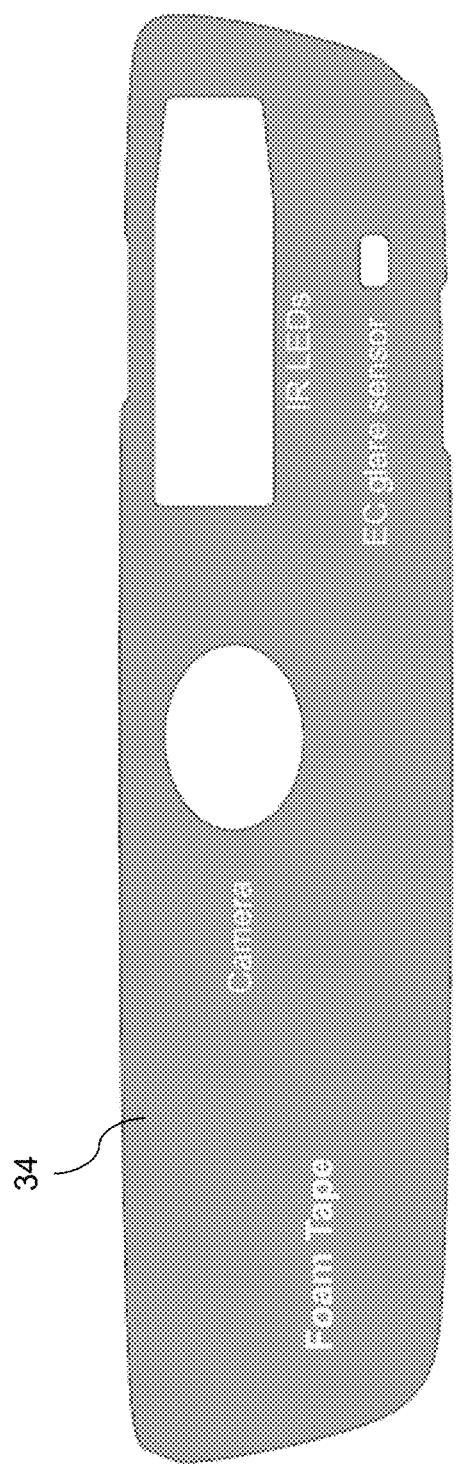
FIG. 18 is a plan view of the foam tape element of the interior rearview mirror assembly.
Figure 19:
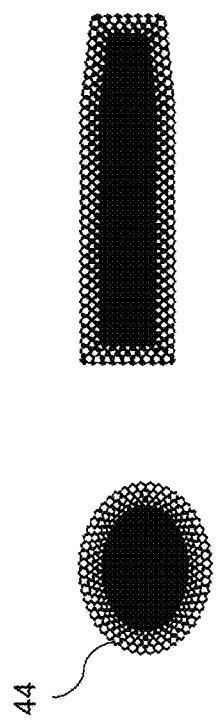
FIG. 19 shows example dot matrices for transitioning between the foam tape element and the electronic component of the interior rearview mirror assembly.
Figure 20:
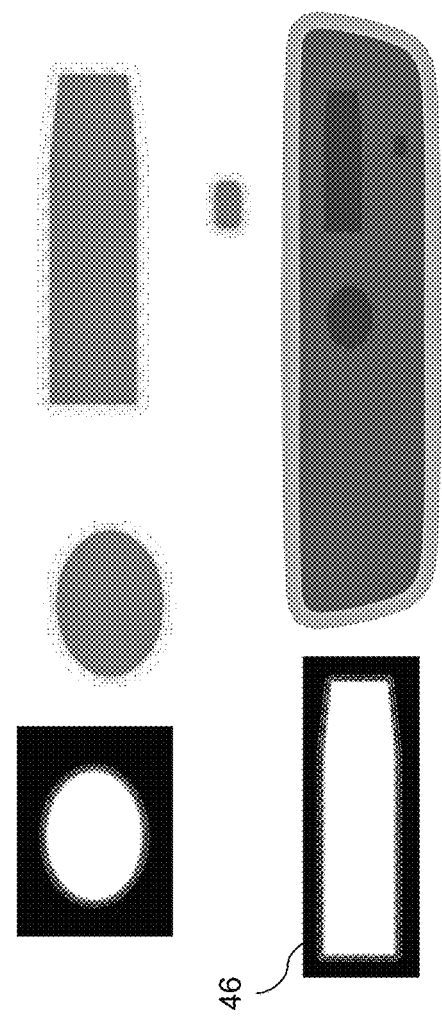
FIG. 20 shows example dithering patterns for transitioning between the foam tape element and the electronic component of the interior rearview mirror assembly.

In order to reduce camera visibility (i.e., the visibility or discernibility of the camera disposed behind the mirror reflective element to the driver or other occupant of the vehicle when viewing the interior rearview mirror assembly), contrast mitigation may be implemented to provide reduced contrast between different components (FIGS. 9-14), or changing camera placement within the mirror head (FIGS. 15-17), or reducing visible light transmissivity of the mirror reflective element, or providing gradual transitions or discontinuous pattern transitions between features, such as by using a dithering pattern or the like at the window or aperture of the foam tape to avoid sharp edges (FIGS. 18-20).

As shown in FIGS. 9-14, color contrast between different components (such as different materials, surface finishes, and angles between surfaces) may draw attention to the camera. Thus, minimizing the contrast may better hide the camera 18 behind the mirror reflective element 14. For example, surfaces that may affect visibility of the camera 18 include the camera lens barrel, a gap 19 between the camera 18 and the attachment plate 20, a chamfer 20a of the attachment plate 20 surrounding the camera 18, and the foam tape 34 surrounding the camera 18 and attaching the mirror reflective element at the mirror head.

Figure 11A:
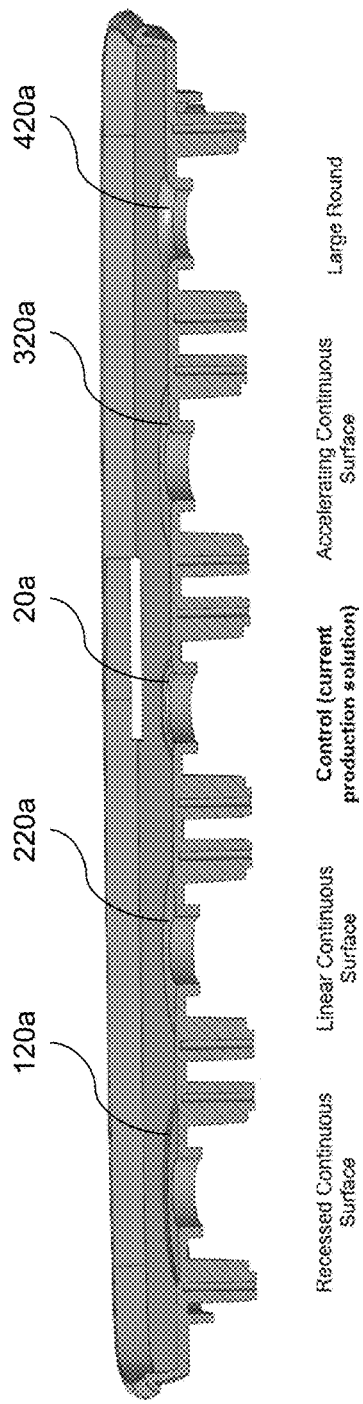
FIGS. 11A and 11B are views of example configurations for the chamfer of the attachment plate surrounding the camera.
Figure 11B:
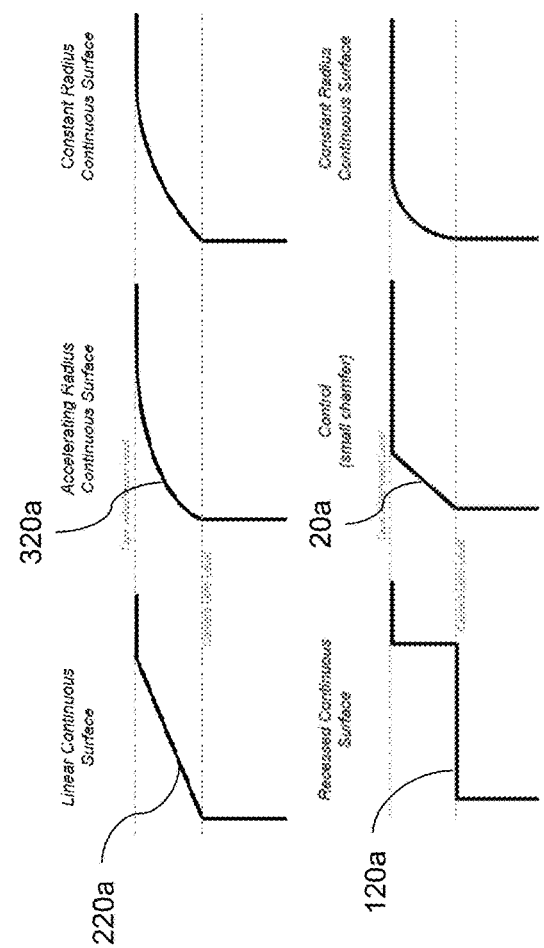

FIGS. 11A and 11B show example configurations for the chamfer of the attachment plate surrounding the camera. FIG. 12 is a chart comparing contrast evaluations for the example chamfer configurations with polished surface finishes and sand blasted or textured surface finishes. For example, the attachment plate may include a standard chamfer 20a, a recessed continuous surface chamfer 120a, a linear continuous surface chamfer 220a, an accelerating continuous surface chamfer 320a and a large round chamfer 420a. The recessed continuous surface chamfer 120a may provide a preferred geometry for mitigating contrast between the camera, attachment plate and foam tape. Further, a middle ground between the linear continuous surface chamfer 220a and the accelerating continuous surface chamfer 320a may provide an elegant solution for mitigating contrast, such as a constant radius continuous surface chamfer.

Figures 13, 14:
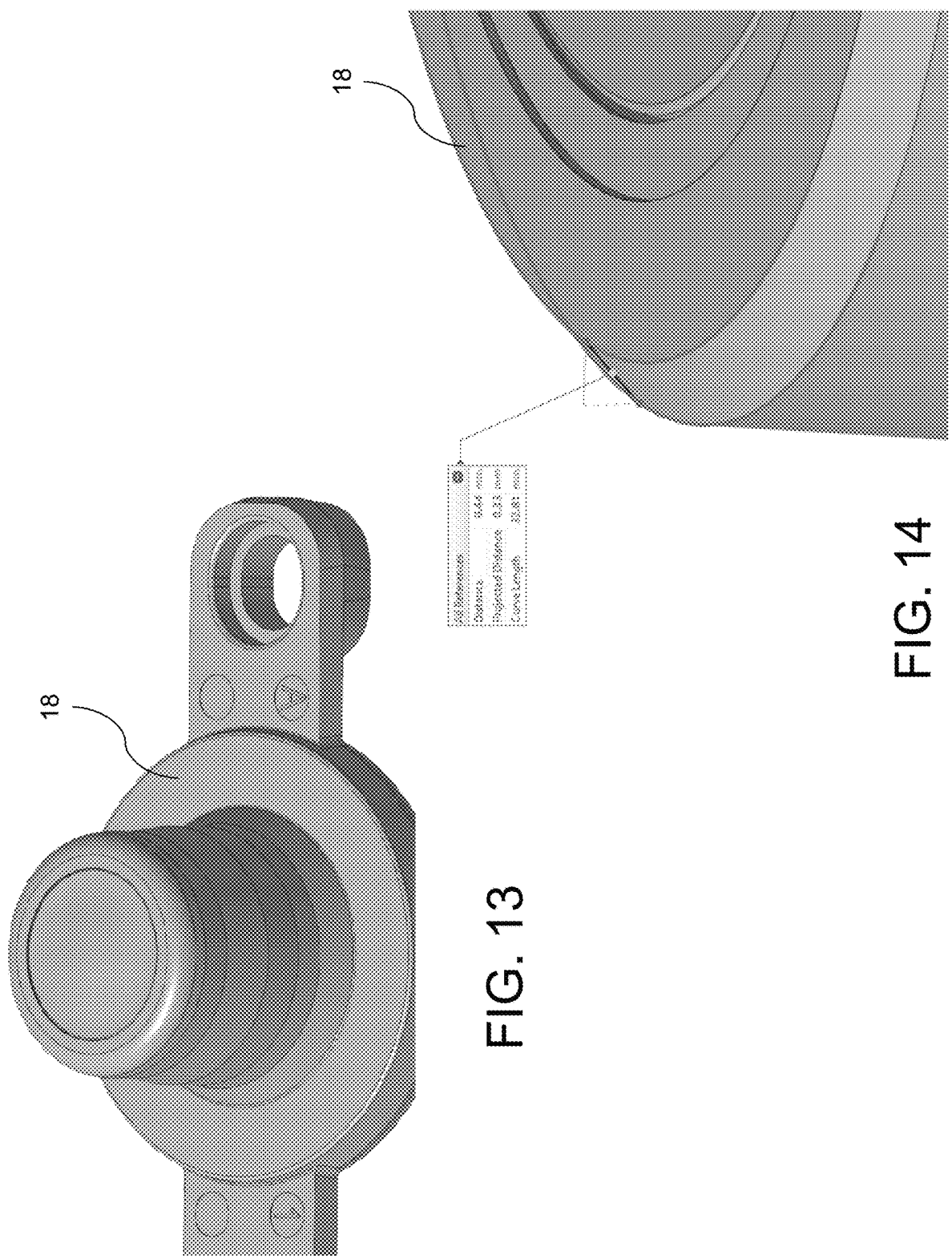
FIGS. 13 and 14 are views of the camera.

Further, and such as shown in FIGS. 13 and 14, the lens of the camera 18 may include a sharp edge or a relatively small chamfer to fully eliminate or reduce or minimize the size of a transition between the camera 18, the gap 19 between the camera 18 and the attachment plate 20, and the attachment plate 20. Thus, minimizing or eliminating the chamfer at the end of the lens barrel of the camera 18 mitigates contrast and camera visibility behind the mirror reflective element.

Figure 15:
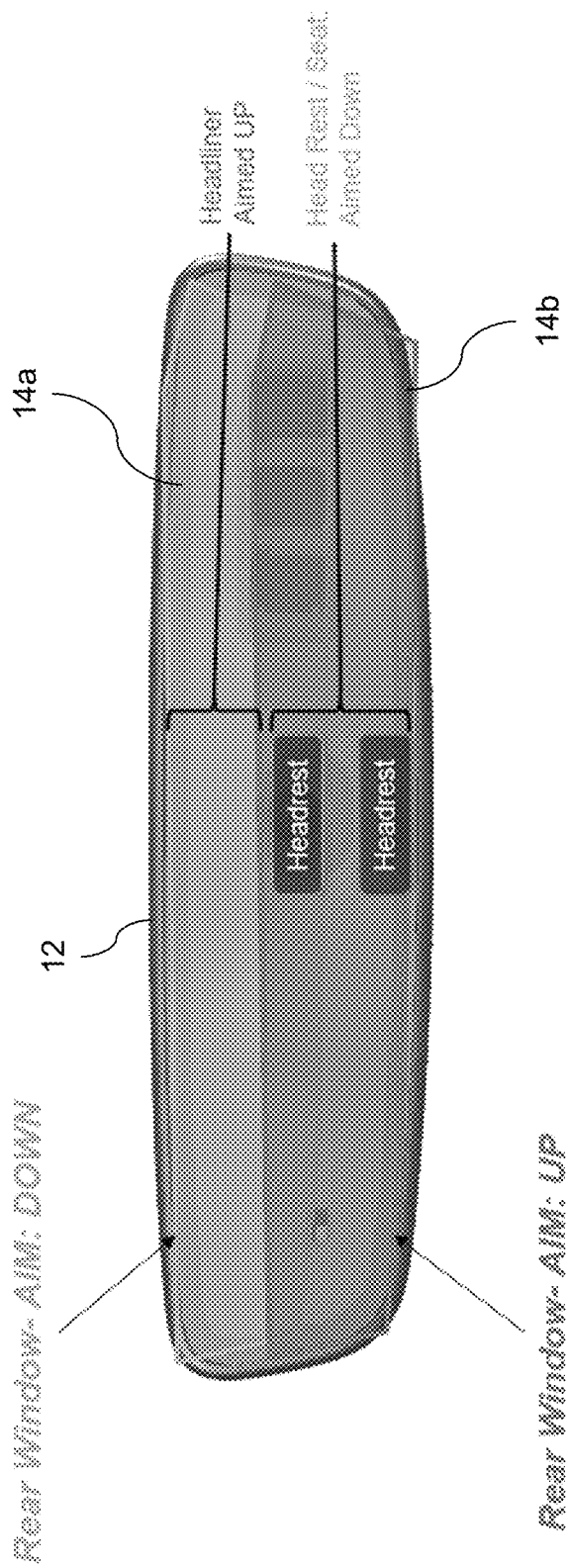
FIG. 15 shows how different placements of the camera can affect camera visibility.

As shown in FIGS. 15-17, the position of the camera 18 within the mirror head affects visibility of the camera behind the mirror reflective element. For example, reflecting a dark headrest or dark headliner at the mirror reflective element in front of the camera results in high visibility of the camera. In other words, if the portion of the mirror reflective element corresponding to the position of the camera is pointed or directed toward a dark region in the rearward field of view provided by the mirror assembly, the camera may be more visible than if the camera is positioned at a portion of the mirror reflective element that reflects brighter or higher illumination portions of the field of view. For example, the upper portion 14a of the mirror reflective element may be more likely to reflect the headliner of the vehicle and the lower portion 14b of the mirror reflective element may be more likely to reflect the head rest or seat position of the vehicle.

Thus, an optimal placement in the mirror head 12 for the camera to mitigate visibility may be a position where, across all driver mirror positions (in one or more different mounting configurations for different vehicles), the camera is rarely or never behind a dark reflected headrest or headliner. For example, the middle of the mirror head 12 may provide an optimal position for the camera.

However, positioning the camera in the middle region of the mirror head 12 may lead to packaging problems for a mirror integrated DMS. For example, FIGS. 16A-16C show how position of the camera 18 in the middle region of the mirror head 12 may lead to interference or crowding between the camera 18 and other electronic components within the mirror head 12.

Further, and as shown in FIG. 17, the position of the camera 18 within the mirror head 12 affects the pitch angle of the camera 18 needed to view the driver's head position and/or gaze direction. For example, a middle position of the camera 18 (i.e., a position of the camera at a middle region of the mirror head) results in an increased pitch angle of the camera compared to a low position of the camera (i.e., a position of the camera at a lower region of the mirror head) and thus may reduce DMS performance. Therefore, position of the camera within the mirror head for camera visibility may be balanced with position of the camera within the mirror head for DMS performance.

Reducing visible light transmission through the mirror reflective element may further reduce visibility of the camera behind the mirror reflective element, such as reducing the visible light transmission of the electrochromic (EC) cell or the prismatic glass of the mirror reflective element to about 25 percent or less. When the visible light transmission of the mirror reflective element is reduced, the video stream (i.e., capture of image data by the camera) may shift from RGB (i.e., capture of image data representative of visible light) to monochromic (e.g., capture of image data representative of IR light or near IR light) at higher ambient lighting conditions than if the visible light transmission is not reduced. For example, a threshold for shift between visible light capture and near IR light capture when the visible light transmission is not reduced may be between 10 lux and 70 lux. EC activation may occur when ambient light levels are below about 30 lux and visible light video stream may not occur when the EC cell is dimmed. Further, lower visible light transmission may affect EC dimming performance and the glare sensor's (e.g., a TI OPT4001 glare sensor) ability to detect headlights rearward of the vehicle. Reducing the visible light transmission may affect transmission of near IR light through the mirror reflective element as well. Thus, reducing the visible light transmission may provide limited improvement to camera visibility.

As shown in FIGS. 18-20, providing feature transitions may reduce visibility of the camera behind the mirror reflective element. That is, slowly transitioning between the camera, near IR LED and/or EC glare sensor may reduce the visibility of the features caused by a sharp edge or transition. For example, the foam tape 34 (FIG. 18) or mirror reflector coating or the chrome or silver coating or IR transmissive paint or coating may include a pattern or feature at the transition between the camera and the feature. As shown in FIG. 19, a dot matrix or frit pattern 44 may be used to transition across the foam tape boundaries of the features. As shown in FIG. 20, a discontinuous pattern or dithering or feathering or gradient pattern 46 may be used to transition across the foam tape boundaries of the features. The pattern may be implemented using screen printing or pad printing.

Figure 21:
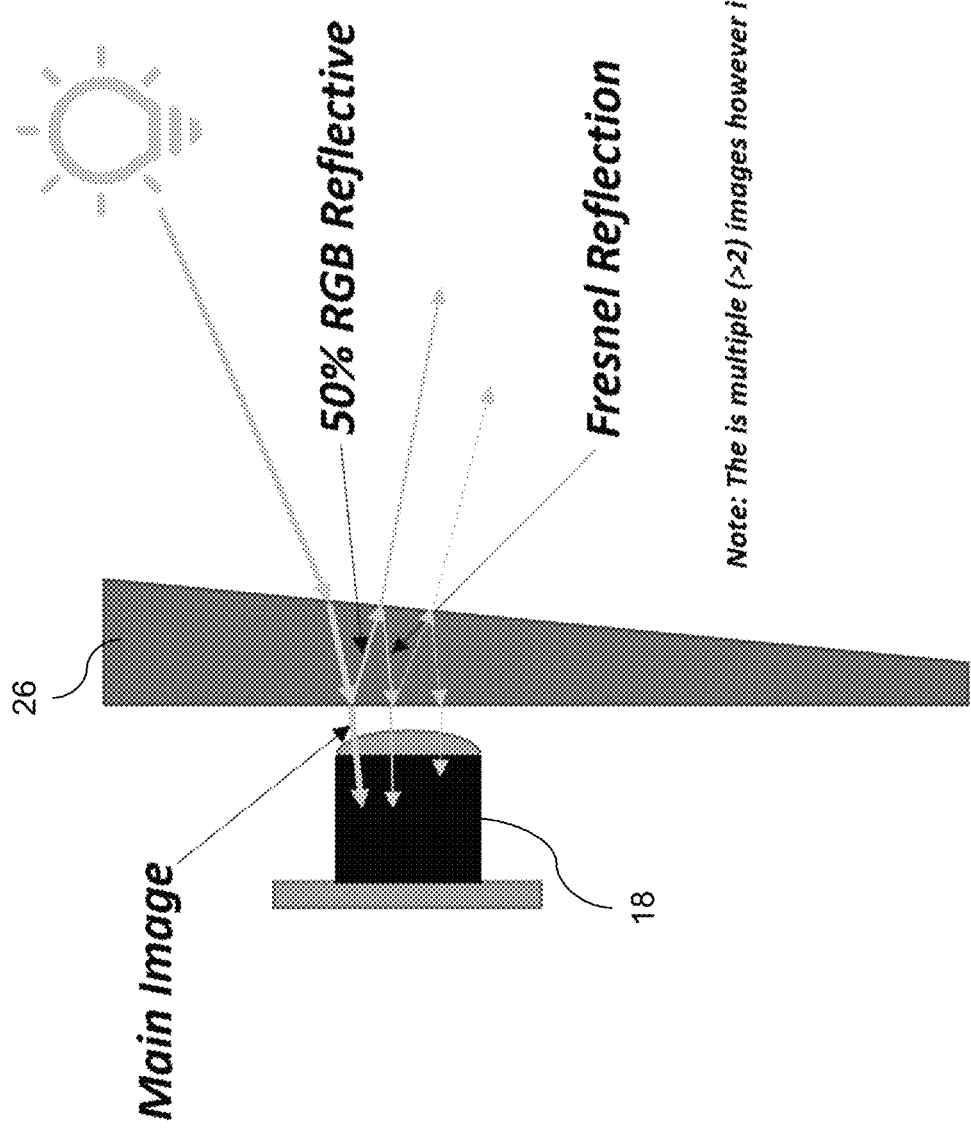
FIG. 21 is a sectional view of a mirror reflective element assembly with a DMS camera disposed at and viewing through the prismatic glass substrate of the mirror reflective element assembly, where the camera views reflections caused by the prismatic glass substrate.
Figure 22:
FIGS. 22 and 23 show example images indicating image processing removal of multiple reflections in the image data captured by the DMS camera of FIG. 21.
Figure 23:
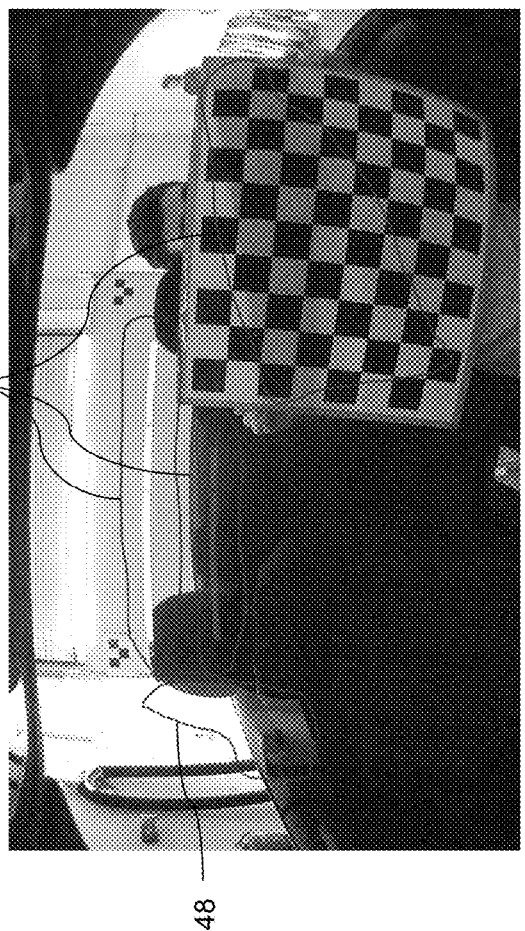

Referring to FIGS. 21-23, visible light passing through the prismatic glass substrate 26 may be internally reflected by the glass substrate 26, resulting in multiple (e.g., greater than two) images being viewed by the camera 18 viewing through the glass substrate 26. In other words, the camera 18 may view light reflected from objects and surfaces within the vehicle and the camera 18 may view reflections 48 of the reflected light caused by the angle of the prismatic glass substrate 26. Processing of the image data captured by the camera 18 may detect and eliminate multiple reflection artifacts 48 in the DMS camera image caused by the prism glass angle. For example, FIGS. 22 and 23 show example images captured by the DMS camera that include reflections 48 caused by the prismatic glass.

Thus, the mirror assembly may include the OCA 30, the ND filter 32 and a mirror reflector coating 28 between the camera 18 and the glass substrate 26 to reduce visibility of the camera 18 behind the mirror reflective element 14. Coupling the OCA 30, the ND filter 32 and a thin five-layer reflective coating 28 provides desired optical performance for the camera 18 and reduces the visibility of the camera 18 for occupants of the vehicle. For example, removing the ND filter 32 may result in light transmission through the mirror reflective element being too high and removing the OCA 30 may result in wet out issues, visibility of imperfections in the foam tape 34 and visibility of the camera 18. Further, use of the OCA 30 and ND filter 32 provides a cost efficient optical solution for reducing visibility of the camera 18, where reducing visibility of the camera is traditionally solved using more expensive and space consuming solutions, such as a thick multilayer coating that does not include OCA or the ND filter.

The mirror assembly 10 includes a printed circuit board (PCB) (such as disposed at the back plate) having a control or control unit comprising electronic circuitry (e.g., disposed at the circuit board or substrate in the mirror casing), which includes driver circuitry for controlling dimming of the mirror reflective element. The circuit board (or a separate DMS circuit board) includes a processor that processes image data captured by the camera 18 for monitoring the driver and determining, for example, driver attentiveness and/or driver drowsiness. The driver monitoring system includes the driver monitoring camera 18 and may also include an occupant monitoring camera (or the driver monitoring camera may have a sufficiently wide field of view so as to view the occupant or passenger seat of the vehicle as well as the driver region), and may provide occupant detection and/or monitoring functions as part of an occupant monitoring system (OMS).

Optionally, the driver monitoring system may process the image data captured by the DMS camera to detect and reduce or eliminate reflection artifacts in the captured image data. For example (and such as shown in FIGS. 22 and 23), the system may use an algorithm to detect and eliminate multiple reflection artifacts 48 in the DMS camera images caused by the prism glass angle of the prismatic mirror reflective element. The processing can determine which portions of the image data represent images due to Fresnel reflections at the prism glass (e.g., via image processing to detect repeated patterns or images that are indicative of a repeated reflection through the prism glass of a portion of the scene viewed by the camera) and can adjust processing to remove such reflection images when processing the captured image data for driver monitoring or occupant monitoring or cabin monitoring.

The mirror assembly may also include one or more light emitters 24 (such as IR or NIR light emitting diodes (LEDs) or vertical-cavity surface-emitting lasers (VCSEL) or the like) disposed at the back plate 20 behind the reflective element 14 and emitting near infrared light (or other non-visible light) through the aperture of the back plate and through the reflective element toward the head region of the driver of the vehicle.

The interior rearview mirror thus may include embedded cameras, IR/NIR illuminators and one or more processors for processing captured image data for the driver monitoring application. The inward facing camera 18 and light emitters 24 are fixed within the mirror head, and thus both components may be coupled with the mirror body. In these cases, the camera's field of view is subject to change from driver to driver as the mirror head is adjusted to set the driver's preferred rearward view.

With the DMS camera disposed in the mirror head, the camera moves with the mirror head (including the mirror casing and mirror reflective element that pivot at a pivot joint that pivotally connects the mirror head to the mounting structure of the interior rearview mirror assembly that in turn mounts at a windshield or at a headliner of the equipped vehicle), such that, when the driver aligns the mirror to view rearward, the camera is aligned with the line of sight of the driver. The location of the DMS camera and IR LED(s) at the mirror head provides an unobstructed view to the driver. The DMS preferably is self-contained in the interior rearview mirror assembly and thus may be readily implemented in a variety of vehicles, including existing vehicles and different models of the same vehicle brand (for example, in a BMW 3-series model and in a BMW X3 model and in a BMW 5-series model and in a BMW X5 model and in an BMW 7-series model, etc.). The driver monitoring camera may also provide captured image data for an occupancy monitoring system (OMS) or another separate camera may be disposed at the mirror assembly for the OMS function.

The mirror assembly may also include one or more infrared (IR) or near infrared light emitters (such as IR or near-IR light emitting diodes (LEDs) or vertical-cavity surface-emitting lasers (VCSEL) or the like) disposed at the back plate 20 behind the reflective element and emitting near infrared light through the aperture of the back plate and through the reflective element toward the head region of the driver of the vehicle. The IR emitter device comprises an IR emitter or LED printed circuit board, with a first set of near infrared light emitting diodes (e.g., a set of wider beam LEDs) at one part of the LED PCB and a second set of near infrared light emitting diodes (e.g., a set of narrower beam LEDs) at another part of the LED PCB. The LED PCB has one part angled relative to the other part to emit light in a desired direction depending on the orientation of the mirror head. Thus, the first set of near infrared light emitting diodes may be angled toward the left side of the vehicle so as to be directed toward a driver of a left hand drive vehicle (if the mirror assembly is installed in a left hand drive vehicle and the first set of near infrared light emitting diodes are enabled for the driver monitoring function), while the second set of near infrared light emitting diodes may be angled toward the right side of the vehicle so as to be directed toward a driver of a right hand drive vehicle (if the mirror assembly is installed in a right hand drive vehicle and the second set of near infrared light emitting diodes are enabled for the driver monitoring function).

Conventional driver monitoring systems (DMS) in likes of BMW, Ford, GM, Tesla, and Subaru vehicles (for example, for GM SuperCruise™ or for Ford's BlueCruise™ as described in https://www.consumerreports.org/car-safety/driver-monitoring-systems-ford-gm-earn-points-in-cr-tests-a6530426322) are "Two-Box" DMS in that (i) the camera used to monitor the driver's head/eyes and the near-IR emitting light sources that illuminate the driver's head/eyes are accommodated in a first box or module (that is usually located at the steering column of an equipped vehicle or in an overhead region of the equipped vehicle) and (ii) the electronics/software used to analyze captured image data to determine the driver's gaze direction or head position or eye movement or alertness or drowsiness is accommodated in a separate second box or module that is located remote from and at a distance from the first box and that connects to the first box typically via a wired connection (the second box typically comprises an ECU that can be part of a head unit of the equipped vehicle and that besides DMS, optionally can provide other features).

A "One-Box" DMS interior rearview mirror assembly has both the camera used to monitor the driver's head/eyes and the near-IR emitting light sources that illuminate the driver's head/eyes accommodated by an interior rearview mirror assembly (and preferably, are both accommodated within the mirror head of the interior rearview mirror assembly). Thus, the one-box DMS interior rearview mirror assembly allows an original equipment manufacturer (OEM) of vehicles (such as for example VW or Toyota or Honda or GM or Ford) to equip vehicles with the likes of a DMS interior rearview mirror assembly that includes the camera/illumination sources/driver monitoring software/associated driver monitoring electronic circuitry such as data processing chip(s), memory, electronic components, printed circuit board(s) that includes data processing chip(s), memory, electronic components, light sensors for detecting glare and ambient lighting, and that includes power supplies, electrical connector(s), heat sink(s), mechanical parts, etc. The One-Box Interior DMS Rearview Mirror Assembly thus can be purchased by an OEM from an interior rearview mirror assembly manufacturer and can be installed by that OEM into a being-assembled vehicle (typically mounting to a mirror mounting button or similar element that is adhered to the in-cabin side of the windshield of the vehicle). To operate in the equipped vehicle, the One-Box Interior DMS Rearview Mirror Assembly connects to a vehicle wiring harness of the vehicle and is supplied via this vehicle wiring harness with ignition voltage (nominal 12V DC but can vary from 9V (6V for automatic stop/start) to 16V or so depending on the vehicle type and the operating condition of the vehicle). The one-box Interior DMS rearview mirror assembly via this wiring harness is supplied with vehicle data, such data including vehicle and other data supplied via a CAN bus or link (that can carry to the mirror vehicle information and that can carry from the mirror distraction alerts, etc.) or supplied via a Local Area Network (LIN) bus or line.

The interior rearview mirror thus has embedded cameras, IR illuminators and the processor for processing captured image data for the driver monitoring application. The inward facing camera 18 and IR illuminators 24 are fixed within the mirror head, and thus both components are coupled with the mirror body. Hence, the camera's field of view is subject to change from driver to driver as the mirror head is adjusted to set the driver's preferred rearward view.

In the illustrated embodiment, the camera and light emitters are disposed behind the mirror reflective element, which may a prismatic mirror reflective element (but aspects described herein may be suitable for use with an electro-optic (such as electrochromic or EC) mirror reflective element). The mirror casing may include a plastic bezel portion that circumscribes the perimeter edge of the mirror reflective element and that provides an outer curved surface that transitions from the outer surface of the mirror casing to the planar front surface of the mirror reflective element (optionally with no part of the plastic bezel portion overlapping or overlaying onto the planar front surface of the mirror reflective element), such that the plastic bezel completes the homologated edge. Optionally, the mirror reflective element may provide an exposed outer curved surface that transitions from the outer surface of the mirror casing to the planar front surface of the mirror reflective element.

The light emitter may have two or three sets of LEDs disposed on the circuit board. One set of LEDs emits a wider beam of near infrared light when energized (e.g., four wider beam LEDs) and another set of LEDs emits a narrower beam of near infrared light when energized (e.g., four narrower beam LEDs). The narrower beam LEDs may be powered or energized for the driver monitoring function, while the wider beam LEDs may be powered or energized for the occupant monitoring function (and may be episodically energized for illuminating particular frames of captured image data, such as by utilizing aspects of the systems described in International Publication Nos. WO 2022/241423 and/or WO 2022/187805, which are all hereby incorporated herein by reference in their entireties).

The narrow beam LEDs are angled or canted or biased (e.g., by ten degrees or thereabouts) toward the left and thus toward the driver of a left hand drive vehicle, while the wider beam LEDs are not biased toward either side. When the mirror assembly is installed in a left hand drive vehicle, the narrow beam LEDs illuminate the driver's head region while the wider beam LEDs illuminate the passenger area as well as the driver area. However, when the mirror assembly is installed in a right hand drive vehicle, the narrow beam LEDs do not illuminate the driver's head region while the wider beam LEDs illuminate the passenger area as well as the driver area.

The mirror assembly may include a near infrared light emitter that is configured and operable to selectively emit light toward the driver head region when the mirror assembly is disposed in a left hand drive vehicle (with the driver sitting in a left side driver seat) or when the mirror assembly is disposed in a right hand drive vehicle (with the driver sitting in a right side driver seat). The system provides for DMS/OMS illumination that is software configurable based on vehicle data for the country code. For example, the DMS light emitters may comprise two or three separate banks/groups/sets of emitters or LEDs. One group is aimed or angled toward the left hand side of the vehicle and one group is aimed or angled toward the right hand side of the vehicle. Optionally, there is a third group that is aimed somewhere in between (in the illustrated examples discussed below, the third group is directed perpendicular to the mirror surface). These groups or sets can be made up of various combinations of wide and narrow LEDs or VCSELs.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 11,518,401; 10,958,830; 10,065,574; 10,017,114; 9,405,120 and/or 7,914,187, and/or U.S. Publication Nos. US-2022-0377219; US-2022-0254132; US-2022-0242438; US-2022-0111857; US-2021-0323473; US-2021-0291739; US-2020-0202151; US-2020-0320320; US-2020-0143560; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2023/034956; WO 2022/241423 and/or WO 2022/187805, and/or International Application No. PCT/US2023/021799, filed May 11, 2023 and published Nov. 16, 2023 as International Publication No. WO 2023/220222, which are all hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Pat. No. 11,242,008 and/or U.S. Publication Nos. US-2021-0162926; US-2021-0155167; US-2018-0134217 and/or US-2014-0285666, and/or International PCT Publication No. WO 2022/150826, which are all hereby incorporated herein by reference in their entireties.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 11,242,008; 10,442,360 and/or 10,046,706, and/or U.S. Publication Nos. US-2021-0155167 and/or US-2019-0118717, and/or U.S. Publication No. US-2021-0162926 and/or International PCT Publication No. WO 2022/150826, which are all hereby incorporated herein by reference in their entireties.

The mirror reflective element may utilize aspects of the mirror reflective elements described in commonly assigned U.S. Pat. Nos. 7,626,749; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, and/or U.S. Publication No. US-2022-0371513, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2020-0039447; US-2015-0327398; US-2015-0015713; US-2014-0160284; US-2014-0226012 and/or US-2009-0295181, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular cabin monitoring system, the vehicular cabin monitoring system comprising:

an interior rearview mirror assembly comprising a mirror head adjustably disposed at a mounting structure, wherein the mounting structure is configured to attach at an interior portion of a vehicle equipped with the vehicular cabin monitoring system, and wherein the mirror head comprises a prismatic mirror reflective element;

a camera accommodated by the mirror head;

wherein the prismatic mirror reflective element comprises a wedge-shaped glass substrate and a mirror reflector coating disposed at a rear side of the wedge-shaped glass substrate;

wherein the prismatic mirror reflective element is adhesively attached at a mirror back plate of the mirror head;

wherein an optically clear adhesive (OCA) and a neutral density (ND) filter are disposed between the mirror back plate and the mirror reflector coating disposed at the rear side of the prismatic mirror reflective element;

wherein the camera views through (i) the OCA, (ii) the ND filter, (iii) the mirror reflector coating of the prismatic mirror reflective element and (iv) the wedge-shaped glass substrate of the prismatic mirror reflective element;

an electronic control unit (ECU) comprising electronic circuitry and associated software;

wherein the electronic circuitry of the ECU comprises an image processor for processing image data captured by the camera; and wherein, with the mounting structure attached at the interior portion of the vehicle, image data captured by the camera is processed at the ECU for a cabin monitoring function.

2. The vehicular cabin monitoring system of claim 1, wherein the OCA is coupled with the ND filter.

3. The vehicular cabin monitoring system of claim 1, wherein the OCA is tinted.

4. The vehicular cabin monitoring system of claim 1, further comprising a light emitter accommodated by the mirror head and operable, when electrically powered to emit light, to emit near infrared (NIR) light.

5. The vehicular cabin monitoring system of claim 4, wherein the light emitter is disposed within the mirror head and behind the prismatic mirror reflective element, and wherein the light emitter, when electrically powered to emit light, emits light that passes through the prismatic mirror reflective element.

6. The vehicular cabin monitoring system of claim 5, wherein the light emitter, when electrically powered to emit light, emits light that passes through (i) the OCA, (ii) the ND filter, (iii) the mirror reflector coating of the prismatic mirror reflective element and (iv) the wedge-shaped glass substrate of the prismatic mirror reflective element.

7. The vehicular cabin monitoring system of claim 4, wherein the light emitter comprises a plurality of light emitting diodes (LEDs).

8. The vehicular cabin monitoring system of claim 4, wherein the ECU is disposed within the mirror head.

9. The vehicular cabin monitoring system of claim 4, wherein the ECU is disposed in the vehicle remote from the mirror head.

10. The vehicular cabin monitoring system of claim 1, wherein the ND filter is disposed between the OCA and the mirror back plate.

11. The vehicular cabin monitoring system of claim 1, wherein the mirror reflector coating of the prismatic mirror reflective element comprises a coating stack comprising a plurality of layers of at least partially reflective material.

12. The vehicular cabin monitoring system of claim 11, wherein the coating stack comprises alternating layers of $Nb_2O_5$ and $SiO_2$.

13. The vehicular cabin monitoring system of claim 11, wherein the coating stack comprises five layers.

14. The vehicular cabin monitoring system of claim 1, wherein a near infrared (NIR) light transmissive coating is disposed between the mirror reflector coating of the prismatic mirror reflective element and the mirror back plate, and wherein the NIR light transmissive coating at least partially transmits NIR light incident at the prismatic mirror reflective element and at least partially attenuates visible light incident at the prismatic mirror reflective element, and wherein the camera views through the NIR light transmissive coating.

15. The vehicular cabin monitoring system of claim 1, wherein a chromatic coating is disposed at the mirror reflector coating of the prismatic mirror reflective element, and wherein the chromatic coating at least partially reflects visible light incident at the prismatic mirror reflective element, and wherein the camera views through an aperture of the chromatic coating.

16. The vehicular cabin monitoring system of claim 15, wherein the chromatic coating comprises a gradient portion at or near the aperture.

17. The vehicular cabin monitoring system of claim 1, wherein the camera is at least partially aligned with an aperture of the mirror back plate of the mirror head.

18. The vehicular cabin monitoring system of claim 17, wherein the mirror back plate comprises a chamfer circumscribing the aperture.

19. The vehicular cabin monitoring system of claim 18, wherein the chamfer comprises a recessed continuous surface.

20. The vehicular cabin monitoring system of claim 1, wherein the vehicular cabin monitoring system, based on processing of image data at the ECU, removes multiple reflection artifacts from the captured image data.

21. The vehicular cabin monitoring system of claim 1, wherein the prismatic mirror reflective element is adhesively attached at the mirror back plate via adhesive tape.

22. The vehicular cabin monitoring system of claim 1, wherein the prismatic mirror reflective element is adhesively attached at the mirror back plate via adhesive foam tape.

23. The vehicular cabin monitoring system of claim 22, wherein the camera is at least partially aligned with an aperture of the adhesive foam tape.

24. The vehicular cabin monitoring system of claim 23, wherein the mirror reflector coating of the prismatic mirror reflective element comprises a discontinuous pattern that at least partially extends along the aperture of the adhesive foam tape.

25. The vehicular cabin monitoring system of claim 1, wherein the cabin monitoring function comprises a driver monitoring function.

26. The vehicular cabin monitoring system of claim 1, wherein the cabin monitoring function comprises an occupant monitoring function.

27. A vehicular cabin monitoring system, the vehicular cabin monitoring system comprising:

an interior rearview mirror assembly comprising a mirror head adjustably disposed at a mounting structure, wherein the mounting structure is configured to attach at an interior portion of a vehicle equipped with the vehicular cabin monitoring system, and wherein the mirror head comprises a prismatic mirror reflective element;

a camera accommodated by the mirror head;

a light emitter accommodated by the mirror head and operable, when electrically powered to emit light, to emit near infrared (NIR) light;

wherein the light emitter is disposed behind the prismatic mirror reflective element, and wherein the light emitter, when electrically powered to emit light, emits light that passes through the prismatic mirror reflective element;

wherein the prismatic mirror reflective element comprises a wedge-shaped glass substrate and a mirror reflector coating disposed at a rear side of the wedge-shaped glass substrate;

wherein the prismatic mirror reflective element is adhesively attached at a mirror back plate of the mirror head;

wherein an optically clear adhesive (OCA) and a neutral density (ND) filter are disposed between the mirror back plate and the mirror reflector coating disposed at the rear side of the prismatic mirror reflective element;

wherein the ND filter is disposed between the OCA and the mirror back plate;

wherein the camera views through (i) the OCA, (ii) the ND filter, (iii) the mirror reflector coating of the prismatic mirror reflective element and (iv) the wedge-shaped glass substrate of the prismatic mirror reflective element;

an electronic control unit (ECU) comprising electronic circuitry and associated software;

wherein the electronic circuitry of the ECU comprises an image processor for processing image data captured by the camera, and wherein the ECU is disposed within the mirror head; and wherein, with the mounting structure attached at the interior portion of the vehicle, image data captured by the camera is processed at the ECU for a cabin monitoring function.

28. The vehicular cabin monitoring system of claim 27, wherein the light emitter, when electrically powered to emit light, emits light that passes through (i) the OCA, (ii) the ND filter, (iii) the mirror reflector coating of the prismatic mirror reflective element and (iv) the wedge-shaped glass substrate of the prismatic mirror reflective element.

29. The vehicular cabin monitoring system of claim 27, wherein the mirror reflector coating of the prismatic mirror reflective element comprises a coating stack comprising a plurality of layers of at least partially reflective material.

30. The vehicular cabin monitoring system of claim 29, wherein the coating stack comprises alternating layers of $Nb_2O_5$ and $SiO_2$.

31. The vehicular cabin monitoring system of claim 27, wherein the cabin monitoring function comprises at least one selected from the group consisting of (i) a driver monitoring function and (ii) an occupant monitoring function.

32. A vehicular cabin monitoring system, the vehicular cabin monitoring system comprising:

an interior rearview mirror assembly comprising a mirror head adjustably disposed at a mounting structure, wherein the mounting structure is configured to attach at an interior portion of a vehicle equipped with the vehicular cabin monitoring system, and wherein the mirror head comprises a prismatic mirror reflective element;

a camera accommodated by the mirror head;

wherein the prismatic mirror reflective element comprises a wedge-shaped glass substrate and a mirror reflector coating disposed at a rear side of the wedge-shaped glass substrate;

wherein the mirror reflector coating of the prismatic mirror reflective element comprises a coating stack comprising a plurality of layers of at least partially reflective material, and wherein the coating stack comprises alternating layers of $Nb_2O_5$ and $SiO_2$;

wherein an adhesive foam tape adhesively attaches the prismatic mirror reflective element at a mirror back plate of the mirror head;

wherein the camera is at least partially aligned with respective apertures of the adhesive foam tape and the mirror back plate of the mirror head;

wherein an optically clear adhesive (OCA) and a neutral density (ND) filter are disposed between the mirror back plate and the mirror reflector coating disposed at the rear side of the prismatic mirror reflective element;

wherein the camera views through (i) the OCA, (ii) the ND filter, (iii) the mirror reflector coating of the prismatic mirror reflective element and (iv) the wedge-shaped glass substrate of the prismatic mirror reflective element;

an electronic control unit (ECU) comprising electronic circuitry and associated software;

wherein the electronic circuitry of the ECU comprises an image processor for processing image data captured by the camera; and wherein, with the mounting structure attached at the interior portion of the vehicle, image data captured by the camera is processed at the ECU for a cabin monitoring function.

33. The vehicular cabin monitoring system of claim 32, wherein the OCA is tinted.

34. The vehicular cabin monitoring system of claim 32, wherein the coating stack comprises five layers.

35. The vehicular cabin monitoring system of claim 32, wherein the mirror back plate comprises a chamfer circumscribing the aperture of the mirror back plate of the mirror head.

36. The vehicular cabin monitoring system of claim 35, wherein the chamfer comprises a recessed continuous surface.

37. The vehicular cabin monitoring system of claim 32, wherein the mirror reflector coating of the prismatic mirror reflective element comprises a discontinuous pattern that at least partially extends along the aperture of the adhesive foam tape.

38. The vehicular cabin monitoring system of claim 32, wherein the cabin monitoring function comprises at least one selected from the group consisting of (i) a driver monitoring function and (ii) an occupant monitoring function.

* * * * *